United States Patent [19]
Fox

[11] Patent Number: 5,296,951
[45] Date of Patent: Mar. 22, 1994

[54] MUTLI-COLOR DISPLAY APPARATUS EMPLOYING SUPERPOSED PLANAR DISCHARGE LAMPS

[75] Inventor: Neil A. Fox, Eversham, England

[73] Assignee: Smiths Industries Public Limited Company, London, England

[21] Appl. No.: 836,821

[22] Filed: Feb. 19, 1992

[30] Foreign Application Priority Data

Feb. 23, 1991 [GB] United Kingdom ............... 9103803
Jun. 17, 1991 [GB] United Kingdom ............... 9112993

[51] Int. Cl.⁵ ................................... G02F 1/1335
[52] U.S. Cl. ................................... 359/48; 359/50
[58] Field of Search ........................... 359/48, 50

[56] References Cited

U.S. PATENT DOCUMENTS

| | | | |
|---|---|---|---|
| 4,872,741 | 10/1989 | Dakin et al. ........................... | 359/49 |
| 4,920,298 | 4/1990 | Hinotani et al. ........................ | 359/50 |
| 4,945,350 | 7/1990 | Kawamura ............................. | 359/50 |
| 5,030,921 | 7/1991 | Kane ................................... | 330/207 R |
| 5,070,273 | 12/1991 | van den Bogert et al. ............. | 359/48 |
| 5,142,388 | 8/1992 | Watanabe et al. ..................... | 359/50 |

FOREIGN PATENT DOCUMENTS 2625584 7/1989 France.

*Primary Examiner*—William L. Sikes
*Assistant Examiner*—Anita Pellman Gross
*Attorney, Agent, or Firm*—Pollock, Vande Sande and Priddy

[57] ABSTRACT

A multicolor display has an LCD display unit with a matrix array of energizable regions. Below the unit are three planar discharge lamps mounted one above the other which emit respectively blue, red and green light. Each lamp has an array of transparent pillars which support opposite plates of the lamps and which are aligned with one another and with the energizable regions of the display unit.

11 Claims, 3 Drawing Sheets

MUTLI-COLOR DISPLAY APPARATUS EMPLOYING SUPERPOSED PLANAR DISCHARGE LAMPS

BACKGROUND OF THE INVENTION

This invention relates to display apparatus.

The invention is more particularly concerned with multi-color display apparatus.

Flat panel displays such as including an active matrix liquid crystal can be arranged to provide a multi-color display by illuminating them with different color lights at different times. Energization of the elements of the matrix display are synchronized to energization of different color lights so that a color display representation is provided. For a full-color display the matrix is illuminated by a sequential train of red, green and blue pulses of light. This can be achieved by using different color tubular lamps as a back light but there are considerable difficulties with such a display in achieving even illumination across the display area. Furthermore, the display tends to be very bulky because of the size of the lamps and their associated reflectors.

SUMMARY OF THE INVENTION

It is an object of the present invention to provide an improved multi-color display.

According to one aspect of the present invention there is provided display apparatus including a display unit having a plurality of display regions that vary in light transmission characteristic when electrically energized, the apparatus including a first planar discharge lamp located below the display unit, the first lamp being energizable to illuminate the display unit with light of a first spectral characteristic, the apparatus including a second planar discharge lamp located below the first lamp, the second lamp being energizable to produce light of a second spectral characteristic different from the first spectral characteristic, and the first lamp being substantially transparent to light from the second lamp so that the display unit can be illuminated through the first lamp.

Preferably, the apparatus includes a third planar discharge lamp located below the second planar discharge lamp, the third lamp being energizable to produce light of a third spectral characteristic different from the first and second spectral characteristics, and the first and second lamps being substantially transparent to light from the third lamp so that the display unit can be illuminated through the second and first lamps. The spectral characteristics of the three lamps are preferably predominantly red, green and blue respectively. The display regions of the display unit may be arranged in a matrix and the display unit may be a liquid crystal display unit. The apparatus preferably includes a reflector below the lowest of the lamps to reflect light upwardly. The lamps are preferably cold cathode discharge lamps and may include an array of transparent pillars that support opposite plates of the lamps. The pillars of one lamp are preferably aligned with the pillars of an adjacent lamp and the pillars are preferably aligned with display regions in the display unit. Each lamp may have a different phosphor coating that emits light of the respective spectral characteristic. The lamps are preferably made of a glass which attenuates u.v. radiation. One of the lamps may have a plurality of channels within it of a V-shape.

A full color display apparatus in accordance with the present invention, will now be described, by way of example, with reference to the accompanying drawings.

DESCRIPTION OF THE PREFERRED EMBODIMENTS

Figure 1:
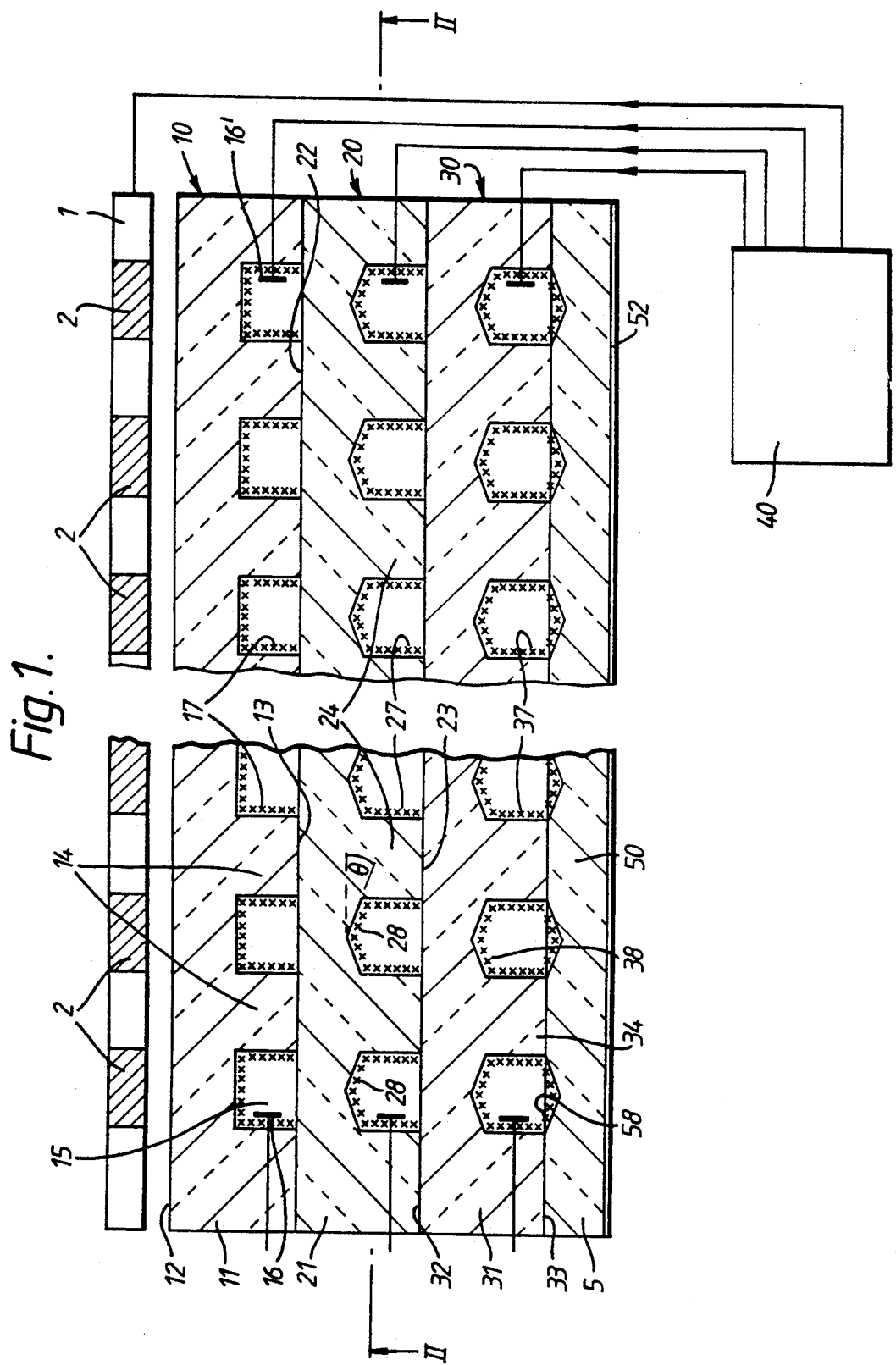
FIG. 1 is a sectional side elevation of the apparatus.

The apparatus comprises a matrix array LCD display panel 1 beneath which are mounted three planar discharge lamps 10, 20 and 30 which respectively emit a blue light, a red light and a green light when energized. On the lower surface of the bottom lamp 30 there is a reflector 50 which reflects light upwardly towards the panel 1. Energization of the three lamps 10, 20 and 30 and the display panel 1 are controlled by a control unit 40.

The display panel 1 may be of conventional construction, having a matrix array of electrically-energizable liquid crystal elements 2 which can be energized to render them transparent or opaque to transmitted radiation, as desired. By energizing appropriate ones of the elements it is possible to produce any desired display representation. It will be appreciated that the display panel 1 may include various polarizers, as is conventional. The techniques for electrically addressing the different ones of the elements 2 in the matrix panel 1 are well know and will not be described here. The display panel 1 need not be of the liquid crystal kind since other display units could be used which have regions that vary in light transmission characteristic when electrically energized.

The lamps 10, 20 and 30 are of a construction such as similar to that described in GB 2247563, GB 9118016, GB 2244855 and WO 9009676.

The upper lamp 10 comprises a flat, rectangular glass plate 11 with a smooth upper surface 12 and a lower surface 13 that is interrupted by an array of pillars 14. The lower surface 13 of the top lamp 10 is sealed to the upper surface 22 of a similar plate 21 forming the intermediate lamp 20. The space 15 between the pillars 14 is filled with a Penning gas mixture, such as of argon gas and mercury vapor at low pressure. Along opposite edges of the lamp 10 extend a pair of electrodes 16 and 16' sealed to the plate 11. The electrodes 16 and 16' are preferably unheated so that the panel forms a gas-discharge device of the cold cathode kind. When a suitable voltage is applied across the electrodes 16 and 16' by the control unit 40, it causes a discharge in the gas mixture which is accompanied by radiation predominantly in the ultra-violet part of the spectrum. The exposed surfaces of the pillars 14 and the lower surface 13 of the plate 11 are coated with a phosphor 17 which fluoresces and emits radiation predominantly in the blue part of the spectrum when irradiated by ultra-violet radiation from the discharge. The phosphor coating 17 may also be deposited on the upper surface 22 of the intermediate lamp 20 except in those regions underlying the pillars 14.

Figure 2:
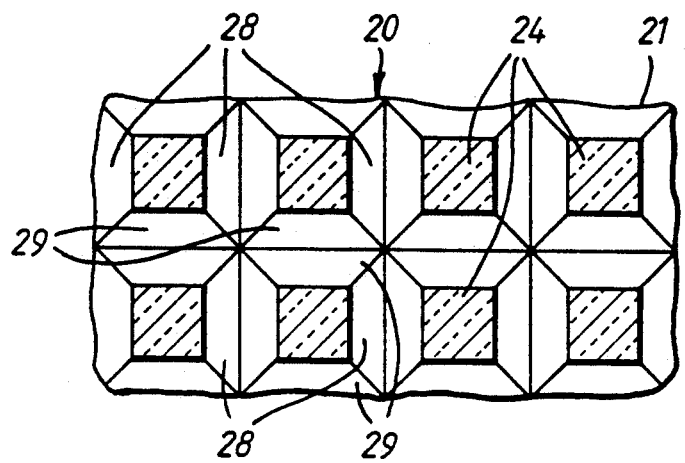
FIG. 2 is a sectional transverse view along the line II—II of FIG. 1.
Figure 4:
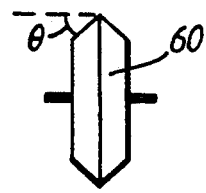
FIG. 4 shows a cutting wheel used to make the apparatus.

The intermediate lamp 2 is located below the upper lamp 10 and is substantially the same as the upper lamp except that, as best shown in FIG. 2, it is formed with orthogonal channels 28 and 29 on its lower surface 23 between the pillars 24. The channels 28 and 29 have vertical sides and V-shape grooves with a slope angle $\theta$ about 41 degrees. The channels 28 and 29 intersect one another at right angles to give an inverted star-shape recess between the corner of each four adjacent pillars 24. The channels 28 and 29 are formed by machining with a diamond-coated cutting wheel 60, as shown in FIG. 4, having a convex V-shape rim with a slant angle $\theta$ of 41 degrees. The wheel 60 is rotated and is moved in straight lines parallel to the y-axis between adjacent columns of pillars 24 so that parallel V-shape channels 28 are formed. The wheel 60 is then moved in straight lines parallel to the x-axis between adjacent rows of pillars 24 to produce parallel V-shape channels 29 that intersect the y-channels 28.

The lower surface 23 of the intermediate plate 21 is sealed to the upper surface 32 of the lower plate 31 and the space between the pillars 24 is filled with the same gas-discharge mixture as in the upper lamp 10. The phosphor coating 27 in the intermediate lamp 20, however, differs from that in the upper lamp 10 in that, when irradiated with ultra-violet radiation from the discharge, it emits light predominantly in the red part of the spectrum, that is, it produces light with a spectral characteristic different from that of the upper lamp. The pillars 24 in the intermediate lamp 21 are aligned with, and are of the same size as the pillars 14 in the upper lamp 10. The upper lamp 10 is substantially transparent to visible light so that radiation from below can pass through it from the intermediate and lower lamps 20 and 30. Similarly, the intermediate lamp 20 is transparent so that radiation from the lower lamp 30 can pass through it.

The lower lamp 30 has an array of pillars 34, identical to those in the intermediate lamp 20, and an identical array of channels 38 and 39 (only 38 being shown) aligned with channels 28 and 29 in the intermediate lamp 20. The lower surface 33 of the lower lamp 30 is sealed to the reflector 50 which is provided by a glass plate 5 with a metallized lower surface 52 which reflects radiation upwardly. The upper surface of the plate 5 is formed with an array of channels 58 and 59 (only 58 being shown) which are of the same width and shape as the channels 38 and 39 in the plate 31 but are shallower. The space between the pillars 34 is filled with the same gas-discharge mixture as in the other two lamps. A green-emitting phosphor 37 is coated on the surface of the pillars 34 and the recesses 38 and 58 so that green light is produced on discharge.

In use, when it is desired to provide a display representation of a blue region, the control unit 40 energizes the display panel 1 so that the panel is rendered opaque except for those matrix elements 2 which are to be blue. At the same, the top lamp 10 is energized to cause gas-discharge within it. The phosphor layer 17 emits blue light in all directions, directly into the plate 11, or via the transparent pillars 14, or downwardly into the intermediate lamp 20 and lower lamp 30. Some of the blue light will be reflected from the phosphor layers 27 and 37 in the two lamps 20 and 30, whereas some of the light will be reflected by the reflector 50. The glass used in the lamps is preferably selected such that ultra-violet radiation is rapidly attenuated on entry into the glass, thereby reducing the risk of ultra-violet radiation emitted in one lamp causing energization of the phosphor in another of the lamps. When blue light is required, the other two lamps 20 and 30 are unenergized, or are energized only at a level insufficient to cause discharge.

When it is desired to produce a red image, the control unit 40 energizes the display panel 1 so that the LCD matrix elements 2 in the regions that are to be red are rendered transparent while the remaining elements are rendered opaque. The intermediate lamp 20 is energized so that discharge within that lamp causes emission of red light from its phosphor 27. The roof of the channels 28 and 29 are inclined such that light emitted from the roof into the glass of the plate 21 is directed preferentially towards the base of the adjacent pillars 14 in the upper lamp 10. Light emitted directly into the transparent pillars 24 of the intermediate lamp 20 is reflected at the walls of the pillar, some of it flowing upwardly into the corresponding pillar 14 in the adjacent upper lamp 10. Light that flows downwardly will either be reflected by surfaces in the lower lamp 30 or by the reflector 50. The red light is thereby channelled to the upper surface of the top lamp 10 through the pillars 14 of the top lamp and illuminates the panel 1.

When a green display representation is needed, the control unit 40 appropriately energizes the panel 1 so that only those matrix elements 2 in the regions that are to be green are transparent. The control unit 40 also energizes the lower lamp 30 to cause it to discharge and hence cause a predominantly green light to be emitted by its phosphor 37. The angled roof of the channels 38 and 39 ensures that a maximum proportion of the light emitted from this surface is directed into the pillars 24 of the adjacent lamp 20 above. Similarly, the angled roof of the channels 58 and 59 in the plate 50 ensures that light emitted downwardly from the roof is directed at the optimal angle for reflection by the lower surface 5 into the transparent pillars 34.

It will be appreciated that, in practice, the lamps 10, 20 and 30 will be energized repeatedly, one after the other many times a second, so that the appearance of a multi-color image is built up.

In some applications, such as in some instrumentation displays, it may not be necessary to have a full-color display. In these circumstances, two lamps of different spectral characteristics may be sufficient.

The arrangement of the present invention enables an even illumination to be produced over the entire panel 1. The pillars 14, 24 and 34 are preferably aligned with each other and with the matrix elements 2 in the panel 1. The lamp assembly formed by the three lamps 10, 20 and 30 can have a small thickness while being very robust. This enables display apparatus to be produced with a very low profile. The panel 1 could be secured to the upper surface 12 of the top lamp 10 so as further to increase the robust nature of the apparatus.

Figure 3:
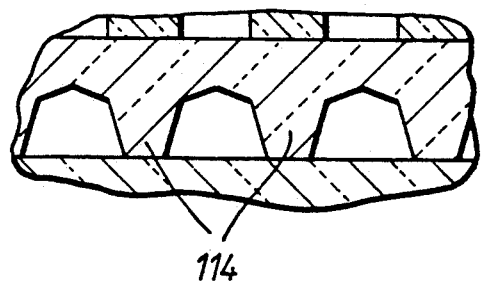
FIG. 3 is a sectional side elevation of a part of alternative apparatus.

The walls of the pillars need not be vertical but could be angled as shown by the pillars 114 in FIG. 3. This results in a smaller aperture for light guiding from the lamp below which may be an advantage in some cases.

Figure 5:
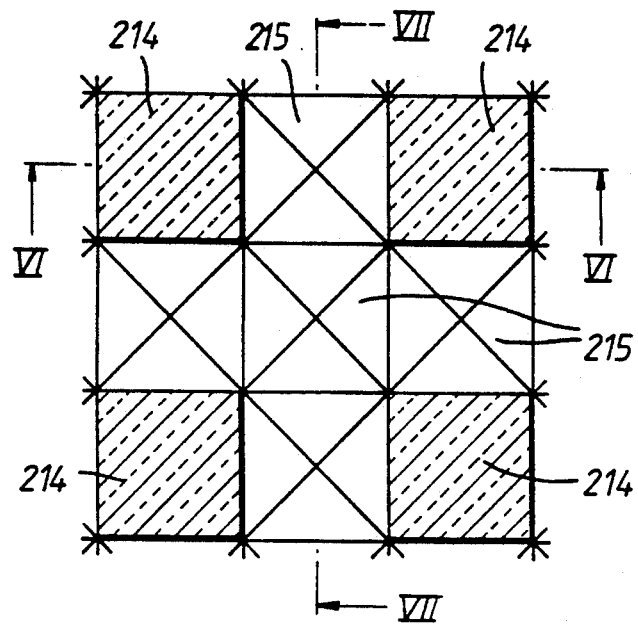
FIG. 5 is a sectional transverse view of a part of further apparatus.
Figure 6:
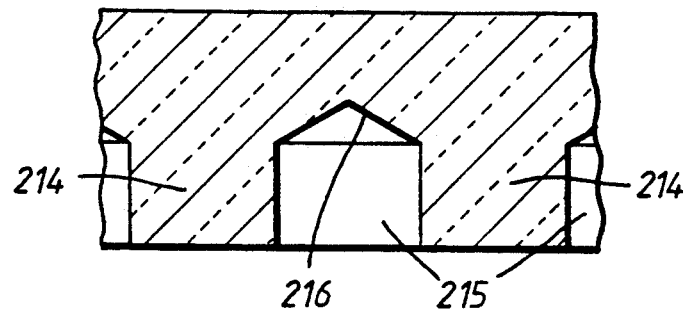
FIG. 6 is a sectional side elevation along the line VI—VI of FIG. 5.
Figure 7:
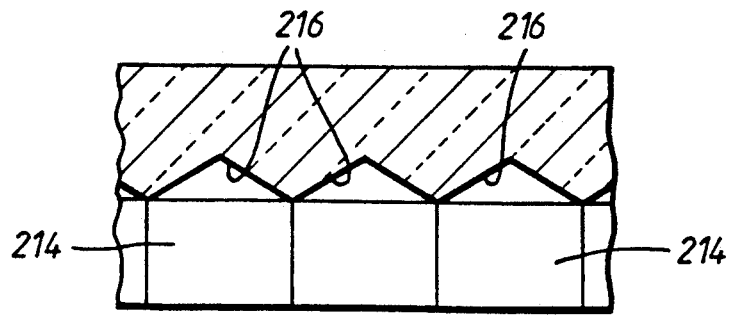
FIG. 7 is a sectional side elevation along the line VII—VII of FIG. 5.

In a plate of further alternative apparatus, illustrated in FIGS. 5 to 7, the channels separating the pillars 214 from one another need not have a V-shape roof but could be divided into square shape recesses 215 each with its own pyramidal roof 216. A plate of this kind could not be made by grooving with a cutting wheel but might, for example, be made by molding.

What I claim is:

1. In display apparatus of the kind including a display unit having a plurality of display regions that vary in light transmission characteristic when electrically energized, the improvement wherein the apparatus includes a first planar discharge lamp mounted below the display unit, the first lamp being energizable to illuminate the display with light of a first spectral characteristic, and a second planar discharge lamp mounted below the first lamp, the second lamp being energizable to produce light of a second spectral characteristic different from the first spectral characteristic, the first lamp being substantially transparent to light from the second lamp so that the display unit can be illuminated by light from said second lamp passing through the first lamp.

2. Display apparatus according to claim 1 wherein the apparatus includes a third planar discharge lamp mounted below the second planar discharge lamp, the third lamp being energizable to produce light of a third spectral characteristic different from the first and second spectral characteristics, the first and second lamps each being substantially transparent to light from the third lamp so that the display unit can be illuminated by light from said third lamp passing through the second and first lamps.

3. Display apparatus according to claim 2, wherein the spectral characteristics of the three lamps are predominantly red, green and blue respectively.

4. Display apparatus according to claim 1, wherein the display regions of the display unit are arranged in a matrix.

5. Display apparatus according to claim 1, wherein the display unit is a liquid crystal display unit.

6. Display apparatus according to claim 1, wherein the apparatus includes a reflector below the lowest of the lamps to reflect light upwardly.

7. Display apparatus according to claim 1, wherein the lamps are cold cathode discharge lamps.

8. Display apparatus according to claim 1, wherein the lamps include two opposite plates and an array of transparent pillars that support the opposite plates, the pillars of one lamp being aligned with the pillars of an adjacent lamp.

9. Display apparatus according to claim 1, wherein at least one of the lamps has a plurality of channels within it of a V-shape.

10. Display apparatus comprising: a display unit with a matrix array of display regions that vary in light transmission characteristic when electrically energized; three planar discharge lamps; means mounting the three lamps above one another below the display unit; and means for energizing the three lamps so that they produce light predominantly of a red, green and blue color respectively, the upper two lamps each being substantially transparent to light from below so that the display unit is illuminated from below.

11. Display apparatus according to claim 10, wherein each lamp comprises a pair of opposite plates supported by an array of transparent pillars, the pillars of said three lamps being aligned with one another and with the display regions of the display unit.

* * * * *